United States Patent
Mihm et al.

(10) Patent No.: US 10,922,413 B2
(45) Date of Patent: Feb. 16, 2021

(54) METHODS AND APPARATUS TO APPLY A FIRMWARE UPDATE TO A HOST PROCESSOR

(71) Applicant: Intel Corporation, Santa Clara, CA (US)

(72) Inventors: James Mihm, Gresham, OR (US); Vernon Mauery, Portland, OR (US)

(73) Assignee: Intel Corporation, Santa Clara, CA (US)

(*) Notice: Subject to any disclaimer, the term of this patent is extended or adjusted under 35 U.S.C. 154(b) by 125 days.

(21) Appl. No.: 16/144,333

(22) Filed: Sep. 27, 2018

(65) Prior Publication Data
US 2019/0042752 A1    Feb. 7, 2019

(51) Int. Cl.
*G06F 21/57* (2013.01)
*G06F 9/4401* (2018.01)
*G06F 8/654* (2018.01)

(52) U.S. Cl.
CPC ............ *G06F 21/572* (2013.01); *G06F 8/654* (2018.02); *G06F 9/4401* (2013.01); *G06F 21/575* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0229173 A1* | 10/2005 | Mihm | ........................ | G06F 8/65 717/171 |
| 2007/0169088 A1* | 7/2007 | Lambert | ............. | G06F 11/0709 717/168 |
| 2008/0140819 A1* | 6/2008 | Bailey | ................... | G06F 13/385 709/223 |
| 2012/0110379 A1* | 5/2012 | Shao | ................... | G06F 11/1417 714/15 |
| 2015/0074385 A1* | 3/2015 | Zheng | ..................... | G06F 8/654 713/2 |
| 2016/0350538 A1* | 12/2016 | Young | .................... | G06F 21/575 |
| 2017/0109235 A1* | 4/2017 | Hung | .................. | G06F 11/1435 |
| 2018/0026835 A1* | 1/2018 | Nachimuthu | ....... | G06F 15/8061 717/172 |
| 2018/0101376 A1* | 4/2018 | Olarig | ....................... | G06F 8/65 |
| 2018/0329862 A1* | 11/2018 | Cao | ........................ | G06F 15/177 |

* cited by examiner

Primary Examiner — Raymond N Phan
(74) Attorney, Agent, or Firm — Hanley, Flight & Zimmerman, LLC

(57) ABSTRACT

Methods, apparatus, systems and articles of manufacture for platform firmware resilience are disclosed. An example apparatus includes a baseboard management controller interface to access a notification from a baseboard management controller that a firmware image is available in a baseboard management memory. A host communicator is to identify, in response to the notification, an occurrence of a boot process of the host processor, the host communicator to halt the boot process. A baseboard management memory interface to access the firmware image in the baseboard management memory. An image validator to validate the firmware image. A firmware memory interface to, when the firmware image is valid, write the firmware image to a firmware memory of the host processor, the host communicator to enable the boot process using the firmware image stored in the firmware memory.

18 Claims, 7 Drawing Sheets

METHODS AND APPARATUS TO APPLY A FIRMWARE UPDATE TO A HOST PROCESSOR

FIELD OF THE DISCLOSURE

This disclosure relates generally to firmware updates, and, more particularly, to methods and apparatus for platform firmware resilience.

BACKGROUND

A system administrator is typically responsible for maintaining and/or managing many different physical computer systems. From time to time, firmware of those physical computer systems is to be updated.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
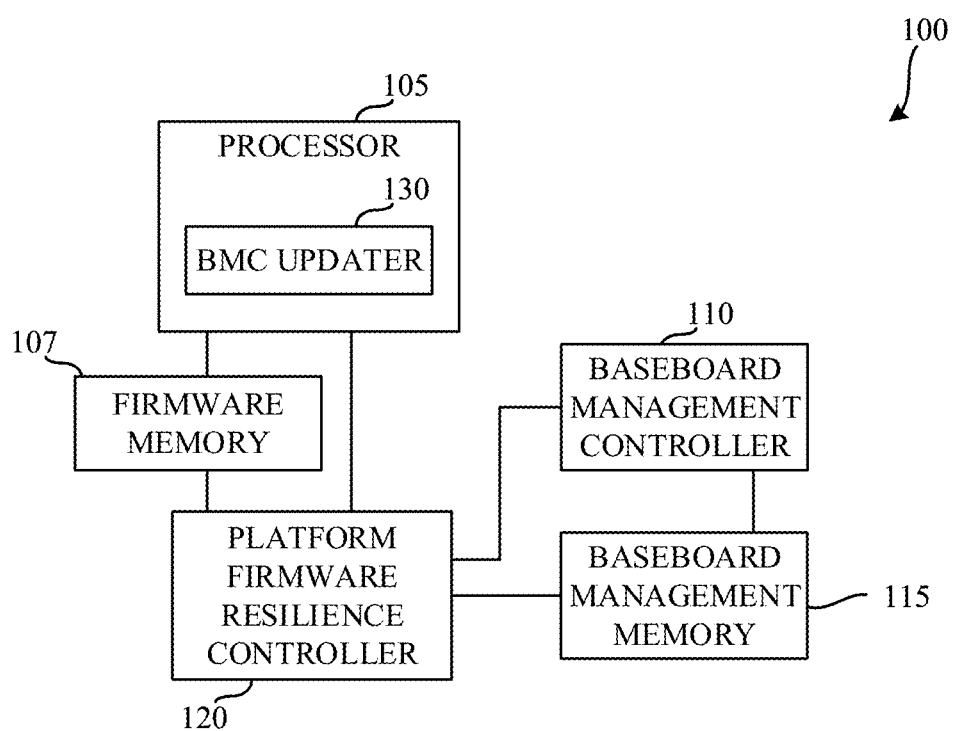
FIG. 1 is a block diagram of an example computer system including a platform firmware resilience controller.

A Basic Input/Output System (BIOS) is a firmware used to initialize a computer during startup (e.g., at power-on). In some examples, the BIOS provides runtime services for operating systems and programs executed by the computer. Having a correctly operating firmware is an important component of operating a computer. In some cases, the firmware may be updated to support different hardware (e.g., a different processor) for use with the computer system. Safe, secure, out-of-band firmware updates are difficult to perform.

In some examples, system administrators utilize computers that implement a baseboard management controller (BMC). A BMC is a specialized processor that monitors the state of a computer, enabling that state information to be reported to the system administrator. The BMC is typically implemented as a component on a motherboard or other main circuit board of the computer. In this manner, the BMC can be operated separately (e.g., be powered on separately) from the host. In some examples, the firmware used by the host processor resides in a memory to which the BMC does not have direct access (e.g., for security purposes).

Previous out-of-band firmware updates performed by the BMC required the firmware (e.g., the BIOS) to be at least functional enough to process a firmware payload provided to the BIOS from the BMC. In some other examples, out-of-band (OOB) BIOS updates are applied via the BMC by giving the BMC direct access to the BIOS flash. The system administrator sends the firmware payload to the BMC and, at the next system reset, the BMC would send the update to the booting (and operational) BIOS. However, such approaches raise security issues/risks.

Because the BIOS is in control of the updates, it is safe and/or secure, but does require the BIOS to be operational. This is not always the case. For example, when updating the processor to a next-generation processor, a BIOS update is typically performed prior to replacing the processor. If such an update is not performed, the new processor may fail to boot with the old BIOS. With a fully out-of-band solution, the firmware (e.g., BIOS) can be updated without the BIOS performing the update.

In examples disclosed herein, a platform firmware resilience (PFR) controller is used in connection with the BMC and the BIOS. In such a configuration, the BMC acts as a secondary staging region for firmware updates. The system administrator may send the firmware update payload directly to the BMC (even with the host powered off). Then, the PFR controller authenticates the firmware update payload before copying the firmware update payload into the firmware flash to perform the firmware update.

In this manner, a safe, secure, out-of-band firmware update can be performed using the PFR controller. First, a system administrator sends a firmware update payload to the BMC. In some examples, the update payload is provided to the BMC with a utility or via one of the BMC's network interfaces (e.g., Hyper Text Transfer Protocol (HTTP) with Secure Sockets Layer (SSL) (HTTPS), Remote Management Control Protocol (RMCP), RMCP+, etc.). In some examples, the BMC performs a best-effort authentication of the firmware payload prior to saving the payload in the BMC flash region used for staging firmware images. The final signature checking and image authentication are performed by the PFR controller prior to actually performing the firmware update. Any checks performed by the BMC are done to improve the user experience (e.g., to provide faster feedback on obviously invalid images). After receiving and/or validating the payload, the BMC notifies the PFR controller that a new firmware image is available. The example PFR controller can then either shut down the host (e.g., force a restart) or wait for a normal admin-directed host shutdown (e.g., based on policy). Once the host shuts down, the PFR controller holds the BMC in reset, and checks the staged firmware image in the BMC memory. If the firmware update was marked for the active region, PFR copies the image into the firmware flash active region. If the firmware update was marked for the recovery region, PFR copies the staged image into the firmware flash temp region and perform the necessary checks to promote the image to a recovery image. After the PFR actions are complete, the PFR controller lets the BMC and host out of reset and allows them both to boot, with the host now booting the newly updated firmware image.

FIG. 1 is a block diagram of an example computer system including a platform firmware resilience controller. The example system 100 of the illustrated example of FIG. 1 includes a processor 105, a firmware memory 107, a BMC 110, a baseboard management memory 115, and a platform firmware resilience controller 120. The example processor 105 of the illustrated example of FIG. 1 implements a BMC updater 130.

The example processor 105 of the illustrated example of FIG. 1 is implemented using hardware. For example, the processor 105 can be implemented by one or more integrated circuits, logic circuits, microprocessors, GPUs, DSPs, or controllers from any desired family or manufacturer. The hardware processor 105 may be a semiconductor based (e.g., silicon-based) device. The example processor 105 operates using firmware stored in the example firmware memory 107.

The example firmware memory 107 of the illustrated example of FIG. 1 is implemented by any memory, storage device and/or storage disc for storing data such as, for example, flash memory, magnetic media, optical media, etc. Furthermore, the data stored in the example firmware memory 107 may be in any data format such as, for example, binary data, comma delimited data, tab delimited data, structured query language (SQL) structures, etc. While in the illustrated example the firmware memory 107 is illustrated as a single element, the example firmware memory 107 and/or any other data storage elements described herein may be implemented by any number and/or type(s) of memories. In the illustrated example of FIG. 1, the firmware memory 107 stores firmware image(s) that are used by the example processor 105.

The example BMC 110 of the illustrated example of FIG. 1 is implemented using a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example BMC 110 accesses a firmware image to be installed. In examples disclosed herein, the firmware image is provided to the BMC 110 via a web interface hosted by the BMC 110. However, the firmware image may be provided to and/or accessed by the example BMC 110 in any fashion such as, for example, Hyper Text Transfer Protocol (HTTP) with Secure Sockets Layer (SSL) (HTTPS), Remote Management Control Protocol (RMCP), RMCP+, etc. In some examples, the BMC performs a best-effort authentication of the firmware payload prior to saving the payload in the baseboard management memory 115, used for staging firmware images.

If the example BMC 110 determines that the image is valid, the example BMC 110 provides an indication of the availability of the image to the platform firmware resilience controller 120. In examples disclosed herein, the BMC 110 communicates with the example platform firmware resilience controller 120 using an inter-integrated circuit (I2C or IIC) communications bus. However, any other approach to informing the platform firmware resilience controller 120 of the availability of a firmware image may additionally or alternatively be used.

The example baseboard management memory 115 of the illustrated example of FIG. 1 is implemented by any memory, storage device and/or storage disc for storing data such as, for example, flash memory, magnetic media, optical media, etc. Furthermore, the data stored in the example baseboard management memory 115 may be in any data format such as, for example, binary data, comma delimited data, tab delimited data, structured query language (SQL) structures, etc. While in the illustrated example the baseboard management memory 115 is illustrated as a single element, the example baseboard management memory 115 and/or any other data storage elements described herein may be implemented by any number and/or type(s) of memories. In the illustrated example of FIG. 1, the baseboard management memory 115 stores firmware images provided to the platform firmware resilience controller 120 for installation into the firmware memory 107. In this manner, the example baseboard management memory 115 operates as a staging area for firmware updates to be applied to the firmware memory 107. In some examples, the example baseboard management memory 115 stores firmware utilized by the example BMC 110. As a result, firmware updates can be applied to the BMC 110 by storing the same in the baseboard management memory 115.

The example platform firmware resilience controller 120 of the illustrated example of FIG. 1 is implemented using a logic circuit such as, for example, a complex programmable logic device (CPLD). However, any other type of circuitry may additionally or alternatively be used such as, for example, one or more analog or digital circuit(s), logic circuits, programmable processor(s), ASIC(s), PLD(s), FPLD(s), DSP(s), etc. An example diagram representing an example implementation of the platform firmware resilience controller 120 is shown in the illustrated example of FIG. 2.

The example platform firmware resilience controller 120 of the illustrated example of FIG. 1 accesses a notification from the BMC 110 that a firmware image is available in a baseboard management memory 115. The platform firmware resilience controller 120, in response to the notification, waits for an occurrence of a boot process of the host processor 105. Upon detecting the boot process, the example platform firmware resilience controller 120 halts the boot process. Halting the boot process enables the platform firmware resilience controller 120 to install a new firmware. The example platform firmware resilience controller 120 accesses the firmware image from the baseboard management memory 115, and validates the firmware image. If the firmware image is valid, the example platform firmware resilience controller 120 writes the firmware image to the firmware memory 107, and enables the host processor 105 to continue the boot process using the firmware image stored in the firmware memory 107.

The example BMC updater 130 of the illustrated example of FIG. 1 is implemented by the example processor 105, and provides firmware updates for the BMC 110.

The example BMC updater 130 accesses a firmware image to be installed at the BMC 110. In examples disclosed herein, the firmware image is provided to the BMC updater 130 via a web interface. However, the firmware image may be provided to and/or accessed by the example BMC updater 130 in any fashion. In some examples, the BMC updater 130 performs a best-effort authentication of the firmware payload prior to saving the payload in the firmware memory 107, used for staging firmware images to be applied to the BMC 110.

If the example BMC updater 130 determines that the image is valid provides an indication of the availability of the image to the platform firmware resilience controller 120. In examples disclosed herein, the BMC 110 communicates with the example platform firmware resilience controller 120 using a inter-integrated circuit (I2C or IIC) communications bus. However, any other approach to informing the platform firmware resilience controller 120 of the availability of a firmware image may additionally or alternatively be used such as, for example, a serial peripheral interface (SPI) communications bus.

Figure 2:
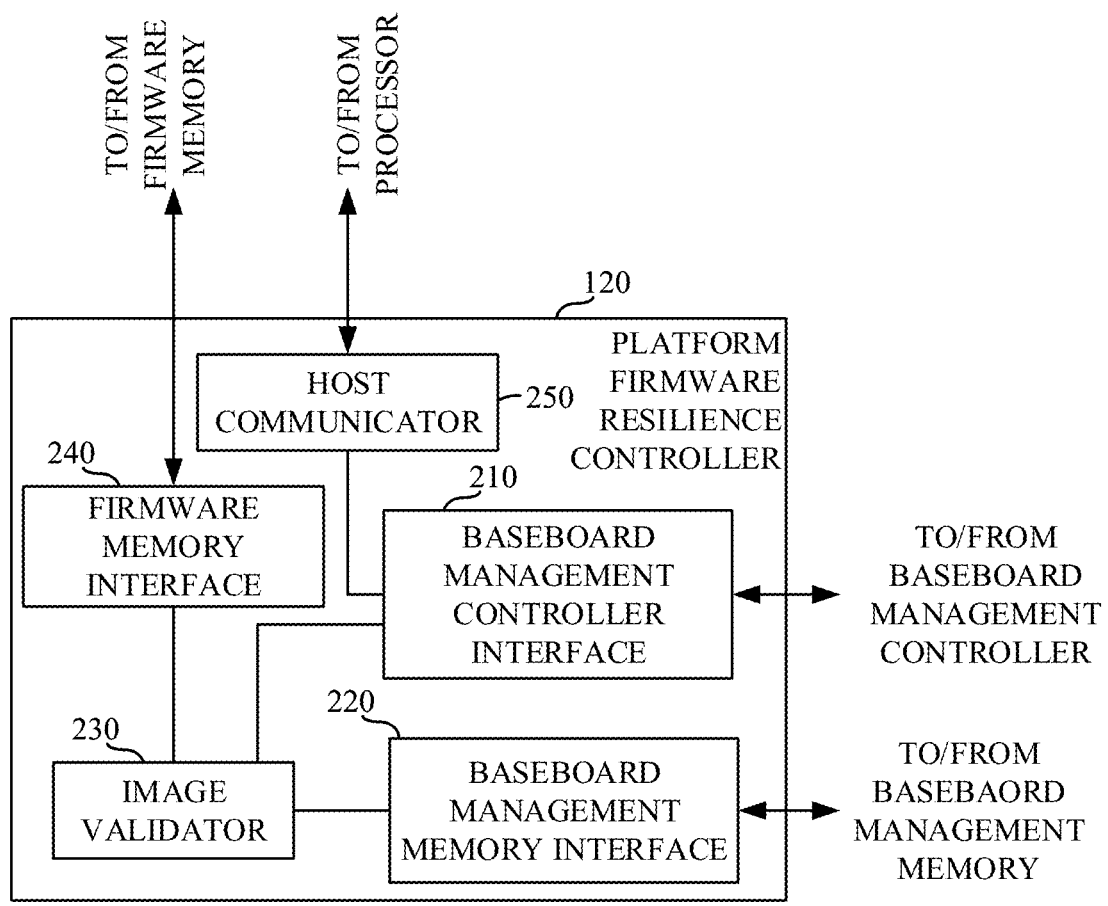
FIG. 2 is a block diagram of the example platform firmware resilience controller of FIG. 1.

FIG. 2 is a block diagram of the example platform firmware resilience controller 120 of FIG. 1. The example platform firmware resilience controller 120 of the illustrated example of FIG. 2 includes an example BMC interface 210, an example baseboard management memory interface 220, an example image validator 230, an example firmware memory interface 240, and an example host communicator 250.

The example BMC interface 210 of the illustrated example of FIG. 2 represents a portion of the logic circuit implemented by the example platform firmware resilience controller 120. The example BMC interface 210 monitors for a notification of a new firmware image from the BMC 110. Upon receipt of a notification, the example BMC interface 210 determines whether the host processor is to be restarted. In examples disclosed herein, firmware updates are applied during the host initialization process. Thus, the host is either restarted at the request of the platform firmware resilience controller 120, or the platform firmware resilience controller 120 waits for the host to be restarted. In some examples, a restart of the host may be forced to cause the host initialization process to occur (e.g., to prevent unwanted delays in application of the firmware update). If the example BMC interface 210 determines that the host restart should be forced, the example host communicator 250 initiates a restart of the host. Alternatively, the example BMC interface 210 may determine that the host restart should not be forced, but instead should be allowed to occur at a later time (e.g., in response to an instruction from a user, in response to a regularly scheduled restart, etc.)

The example baseboard management memory interface 220 of the illustrated example of FIG. 2 represents a portion of the logic circuit implemented by the example platform firmware resilience controller 120. Upon detection of the host boot process, the example baseboard management memory interface 220 accesses the firmware image to determine the readiness of the image to be installed. As some time may have passed since the BMC 110 provided the indication of the image availability (e.g., if the restart of the host was not forced), the image might no longer be ready and/or available. In some examples, the image may be considered ready to be installed if the baseboard management memory interface 220 is able to access the image in the baseboard management memory 115. The example baseboard management memory interface 220 determines whether the image is ready.

If the image is not ready, the example firmware memory interface 240 clears the flag in the firmware memory indicating to the host that the boot process may proceed. Alternatively, in some examples, the example baseboard management memory interface 220 may wait an amount of time and/or re-check to determine whether the image is ready before determining that the image is not ready, thereby allowing the host to continue the boot process. If the image is ready, the example baseboard management memory interface 220 accesses the image and provides the same to the image validator 230.

The example image validator 230 of the illustrated example of FIG. 2 represents a portion of the logic circuit implemented by the example platform firmware resilience controller 120. The example image validator 230 then validates the image accessed by the example baseboard management memory interface 220 In examples disclosed herein, the image validator 230 validates the image by computing a checksum, and comparing the computed checksum against a known value. However, any other approach for validating an image may additionally or alternatively be used.

The example firmware memory interface 240 of the illustrated example of FIG. 2 represents a portion of the logic circuit implemented by the example platform firmware resilience controller 120. The example firmware memory interface 240 sets and/or clears a flag in the firmware memory 107 indicating to the host that the boot process should be halted. In effect, setting and/or clearing of the flag causes the boot process to be halted. Of course, any other approach to halting a boot process may additionally or alternatively be used.

The example firmware memory interface 240 writes validated firmware to the firmware memory 107. In examples disclosed herein, the example firmware memory interface 240 writes the image to an appropriate region (e.g., an active region or a recovery region) of the firmware memory 107. For example, if the firmware update was marked for the active region, the example firmware memory interface 240 copies the image into an active region of the firmware memory 107. If the firmware update was marked for the recovery region, the example firmware memory interface 240 copies the staged image into a temporary region of the firmware memory 107 and performs checks to promote the image to a recovery image.

The example host communicator 250 of the illustrated example of FIG. 2 represents a portion of the logic circuit implemented by the example platform firmware resilience controller 120. The example host communicator 250 monitors the host processor 105 to identify when a host initialization (e.g., a boot process) is occurring. In some examples, the example host communicator 250 initiates a restart of the host processor 105, thereby triggering the initialization. The example host communicator 250 waits until the host initialization is detected before proceeding and, upon detection of the host initialization, alerts the firmware memory interface 240, to enable the firmware memory interface 240 to set a flag in the firmware memory 107 to halt the boot process. However, the processor 105 may be instructed to halt the boot process in any other fashion. For example, instead of setting a flag in the firmware memory 107, the example host communicator 250 may send an alert to the host processor 105 to halt the boot process. In some examples, operations of the BMC 110 are also halted, to ensure that only one device (e.g., the platform firmware resilience controller 120) accesses the baseband management memory 115 at a time. In some examples, other approaches to ensuring that only a single device accesses the baseband management memory 115 may additionally or alternatively be used.

While an example manner of implementing the example platform firmware resilience controller 120 of FIG. 1 is illustrated in FIG. 2, one or more of the elements, processes and/or devices illustrated in FIG. 2 may be combined, divided, re-arranged, omitted, eliminated and/or implemented in any other way. Further, the example BMC interface 210, the example baseboard management memory interface 220, the example image validator 230, the example firmware memory interface 240, the example host communicator 250, and/or, more generally, the example platform firmware resilience controller 120 of FIGS. 1 and/or 2 may be implemented by hardware, software, firmware and/or any combination of hardware, software and/or firmware. Thus, for example, any of the example BMC interface 210, the example baseboard management memory interface 220, the example image validator 230, the example firmware memory interface 240, the example host communicator 250, and/or, more generally, the example platform firmware resilience controller 120 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example BMC interface 210, the example baseboard management memory interface 220, the example image validator 230, the example firmware memory interface 240, the example host communicator 250, and/or, more generally, the example platform firmware resilience controller 120 of FIGS. 1 and/or 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example platform firmware resilience controller 120 of FIGS. 1 and/or 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
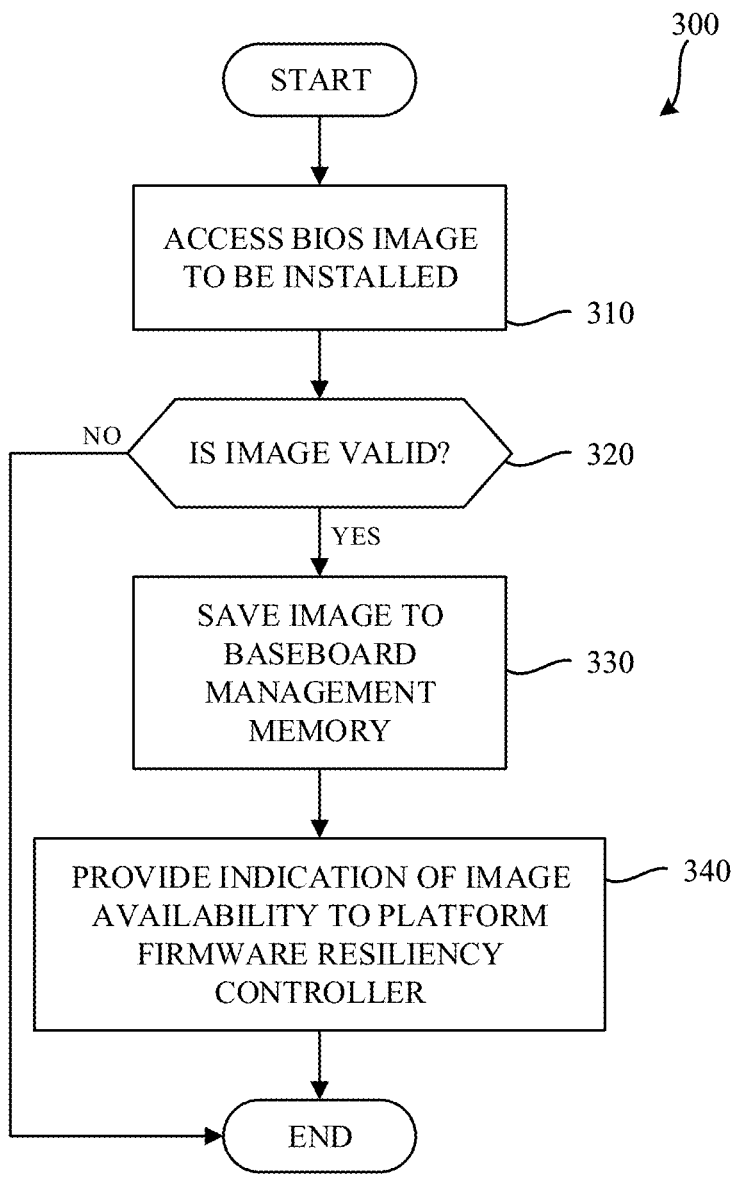
FIG. 3 is a flowchart representative of machine readable instructions which may be executed to implement the example baseboard management controller (BMC) of FIG. 1.
Figure 4:
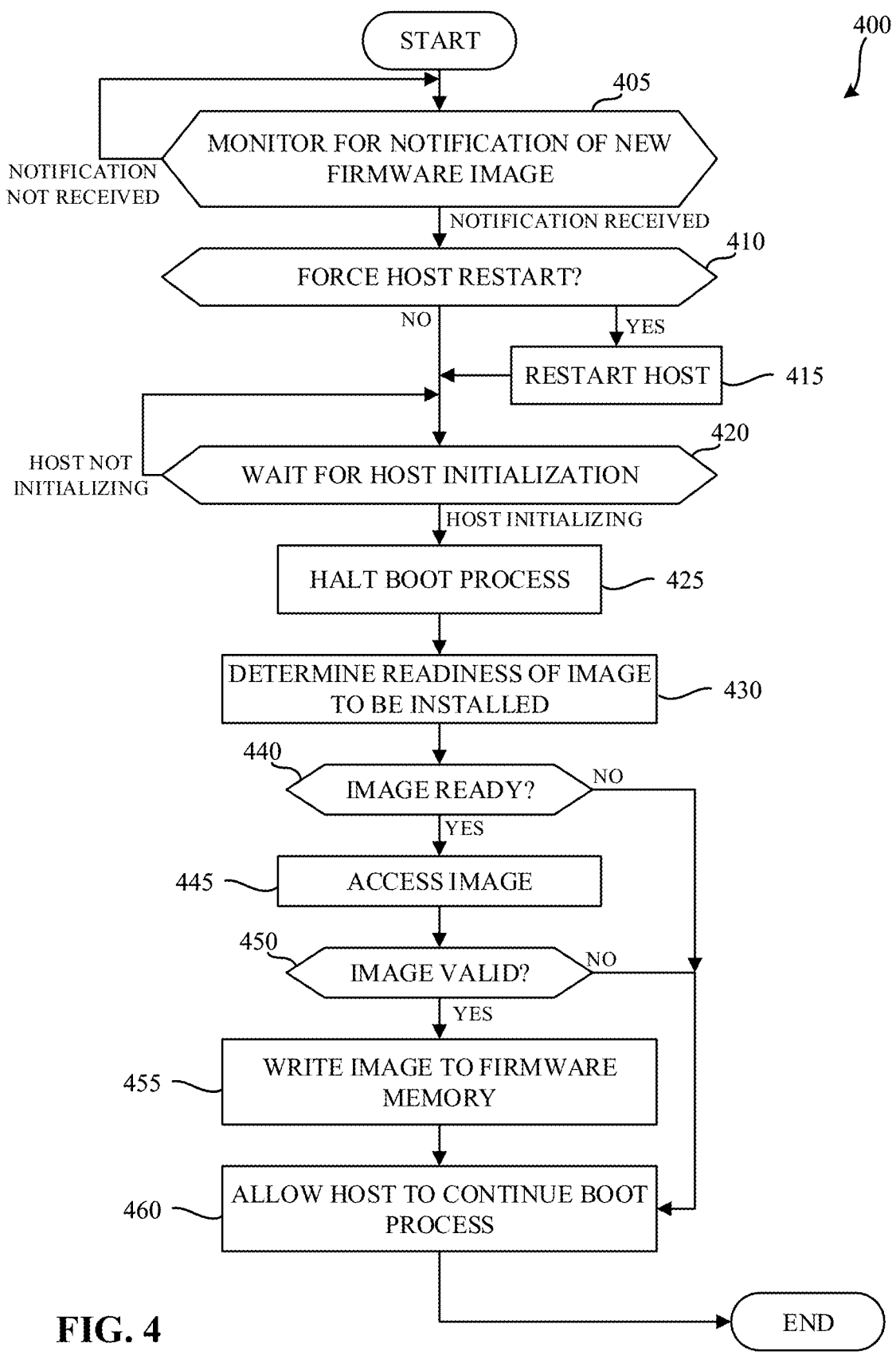
FIG. 4 is a flowchart representative of machine readable instructions which may be executed to implement the example platform firmware resilience controller of FIGS. 1 and/or 2 to update a firmware used by the processor of FIG. 1.
Figure 5:
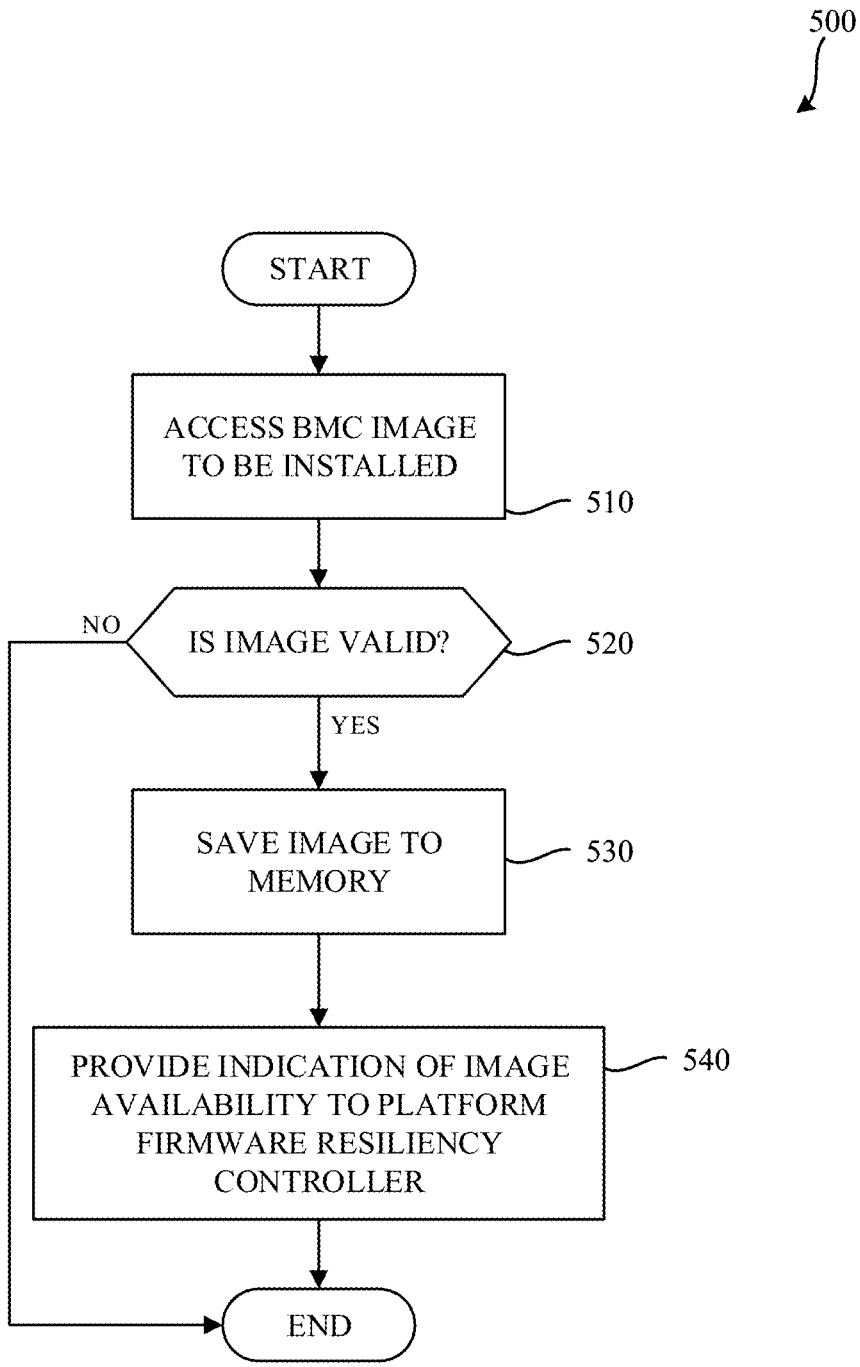
FIG. 5 is a flowchart representative of machine readable instructions which may be executed to implement the example BMC updater of FIG. 1.

A flowchart representative of example hardware logic, machine readable instructions, hardware implemented state machines, and/or any combination thereof for implementing the example BMC 110 of FIG. 1 is shown in FIG. 3. Flowcharts representative of example hardware logic, machine readable instructions, hardware implemented state machines, and/or any combination thereof for implementing the example platform firmware resilience controller 120 of FIGS. 1 and/or 2 are shown in FIGS. 4 and/or 6. A flowchart representative of example hardware logic, machine readable instructions, hardware implemented state machines, and/or any combination thereof for implementing the example BMC updater 130 of FIG. 1 is shown in FIG. 5. The machine readable instructions may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 3, 4, 5, and/or 6, many other methods of implementing the example BMC 110, the example platform firmware resilience controller 120, and/or the example BMC updater 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3, 4, 5, and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 3 is a flowchart representative of machine readable instructions which may be executed to implement the example BMC 110 of FIG. 1. The example process 300 of the illustrated example of FIG. 3 begins when the example BMC 110 accesses a firmware image to be installed. (Block 310). In examples disclosed herein, the firmware image is provided to the BMC 110 via a web interface hosed by the BMC 110. However, the firmware image may be provided to and/or accessed by the example BMC 110 in any fashion.

The example BMC 110 determines whether the image is valid. (Block 320). In examples disclosed herein, the image is validated by the example BMC 110 by performing an integrity check on the image. Performing an integrity check enables the BMC 110 to quickly inform a system administrator of a failed attempt to provide an image. However, any other approach to validating an image may additionally or alternatively be used. If the example BMC 110 determines that the image is not valid (e.g., block 320 returns a result of NO), the example process 300 of FIG. 3 terminates. In some examples, the BMC 110 provides an alert to a system administrator that the provided image was not valid.

If the example BMC 110 determines that the image is valid (e.g., block 320 returns a result of YES), the example BMC 110 saves the accessed image to the baseboard management memory 115. (Block 330). The example BMC 110 then provides an indication of the availability of the image to the platform firmware resilience controller 120. (Block 340). In examples disclosed herein, the BMC 110 communicates with the example platform firmware resilience controller 120 using an I2C communications bus. However, any other approach to informing the platform firmware resilience controller 120 of the availability of a firmware image may additionally or alternatively be used. The example process 300 of the illustrated example of FIG. 3 then terminates.

FIG. 4 is a flowchart representative of machine readable instructions which may be executed to implement the example platform firmware resilience controller of FIGS. 1 and/or 2 to update a firmware used by the processor of FIG. 1. The example process 400 the illustrated example of FIG. 4 begins when the example BMC interface 210 monitors for a notification of a new firmware image. (Block 405). The example BMC interface 210 continues to wait until a notification is received (e.g., if block 405 does not detect a notification). Upon receipt of a notification, the example BMC interface 210 determines whether the host processor is to be restarted. (Block 410). In examples disclosed herein, firmware updates are applied during the host initialization process. Thus, the host is either restarted at the request of the platform firmware resilience controller 120, or the platform firmware resilience controller 120 waits for the host to be restarted. In some examples, a restart of the host may be forced to cause the host initialization process to occur (e.g., to prevent unwanted delays in application of the firmware update). If the example BMC interface 210 determines that the host restart should be forced (e.g., block 410 returns a result of YES), the example host communicator 250 initiates a restart of the host. (Block 415). Alternatively, the example BMC interface 210 may determine that the host restart should not be forced, but instead should be allowed to occur at a later time (e.g., in response to an instruction from a user, in response to a regularly scheduled restart, etc.)

The example host communicator 250 then monitors the host to identify when a host initialization is occurring. (Block 420). The example host communicator 250 waits until the host initialization is detected before proceeding. Upon detection of the host initialization process (e.g., block 420 returning a result of HOST INITIALIZING), the example firmware memory interface 240 sets a flag in the firmware memory 107 indicating to the host that the boot process should be halted. (Block 425). The example baseboard management memory interface 220 accesses the firmware image to determine the readiness of the image to be installed. (Block 430). As some time may have passed since the BMC provided the indication of the image availability (see block 340 of FIG. 3) (e.g., if the restart of the host was not forced), the image might no longer be ready and/or available. The image may be considered ready to be installed if the baseboard management memory interface 220 is able to access the image in the baseboard management memory 115. The example baseboard management memory interface 220 determines whether the image is ready. (Block 440). If the image is not ready, the example firmware memory interface 240 clears the flag in the firmware memory indicating to the host that the boot process may proceed. (Block 460). Alternatively, in some examples, the example baseboard management memory interface 220 may wait an amount of time and/or re-check to determine whether the image is ready before determining that the image is not ready, thereby allowing the host to continue the boot process.

If the image is ready (e.g., block 440 returns a result of YES), the example image validator 230 accesses the image via the example baseboard management memory interface 220. (Block 445). The example image validator 230 then validates the image. (Block 450). In examples disclosed herein, the validator validates the image by computing a checksum, and comparing the computed checksum against a known value. If the image is not valid (e.g., block 450 returns a result of NO), the example firmware memory interface 240 clears the flag in the firmware memory indicating to the host that the boot process may proceed. (Block 460). That is, booting is allowed to continue without installation of the firmware image.

If the example image validator 230 determines that the image is valid (e.g., block 450 returns a result of YES), the example firmware memory interface 240 writes the validated image to the firmware memory. (Block 455). In examples disclosed herein, the example firmware memory interface 240 writes the image to the appropriate region (e.g., an active region or a recovery region). For example, if the firmware update was marked for the active region, the example firmware memory interface 240 copies the image into an active region of the firmware memory 107. If the firmware update was marked for the recovery region, the example firmware memory interface 240 copies the staged image into a temporary region of the firmware memory 107 and performs checks to promote the image to a recovery image. The example firmware memory interface 240 then clears the flag in the firmware memory 107 indicating to the host that the boot process may proceed. (Block 460). The example process 400 of the illustrated example of FIG. 4 then terminates.

While in the illustrated examples of FIGS. 3 and/or 4, the BMC 110 provides an image to the platform firmware resilience controller 120 to update the firmware memory 107, in some examples, the processor 105 (implementing a BMC updater 130) may provide an image to the platform firmware resilience controller 120 for updating the BMC 110. FIG. 5 is a flowchart representative of machine readable instructions which may be executed to implement the example BMC updater 130 of FIG. 1.

The example process 500 of the illustrated example of FIG. 5 begins when the example BMC updater 130 accesses an image to be installed on the BMC. (Block 510). In examples disclosed herein, the image is provided to the BMC updater 130 via a graphical user interface. However, the image may be provided to and/or accessed by the example BMC updater 130 in any fashion.

The example BMC updater 130 determines whether the image is valid. (Block 520). In examples disclosed herein, the image is validated by the example BMC updater 130 by performing an integrity check on the image. Performing an integrity check enables the BMC updater 130 to inform a system administrator of a failed attempt to provide an image. However, any other approach to validating an image may additionally or alternatively be used. If the example BMC updater 130 determines that the image is not valid (e.g., block 520 returns a result of NO), the example process 500 of FIG. 5 terminates. In some examples, the BMC updater 130 provides an alert to a system administrator that the provided image was not valid.

If the example BMC updater 130 determines that the image is valid (e.g., block 520 returns a result of YES), the example baseboard management controller 110 saves the accessed image to the firmware memory 107. (Block 530). However, any other memory location may additionally or alternatively be used. The example BMC updater 130 then provides an indication of the availability of the image to the platform firmware resilience controller 120. (Block 540). In examples disclosed herein, the BMC updater 130 communicates with the example platform firmware resilience controller 120 by setting a flag indicative of the availability of an image in the firmware memory 107 (or any other system memory). However, any other approach to informing the platform firmware resilience controller 120 of the availability of an image may additionally or alternatively be used. The example process 500 of the illustrated example of FIG. 5 then terminates.

Figure 6:
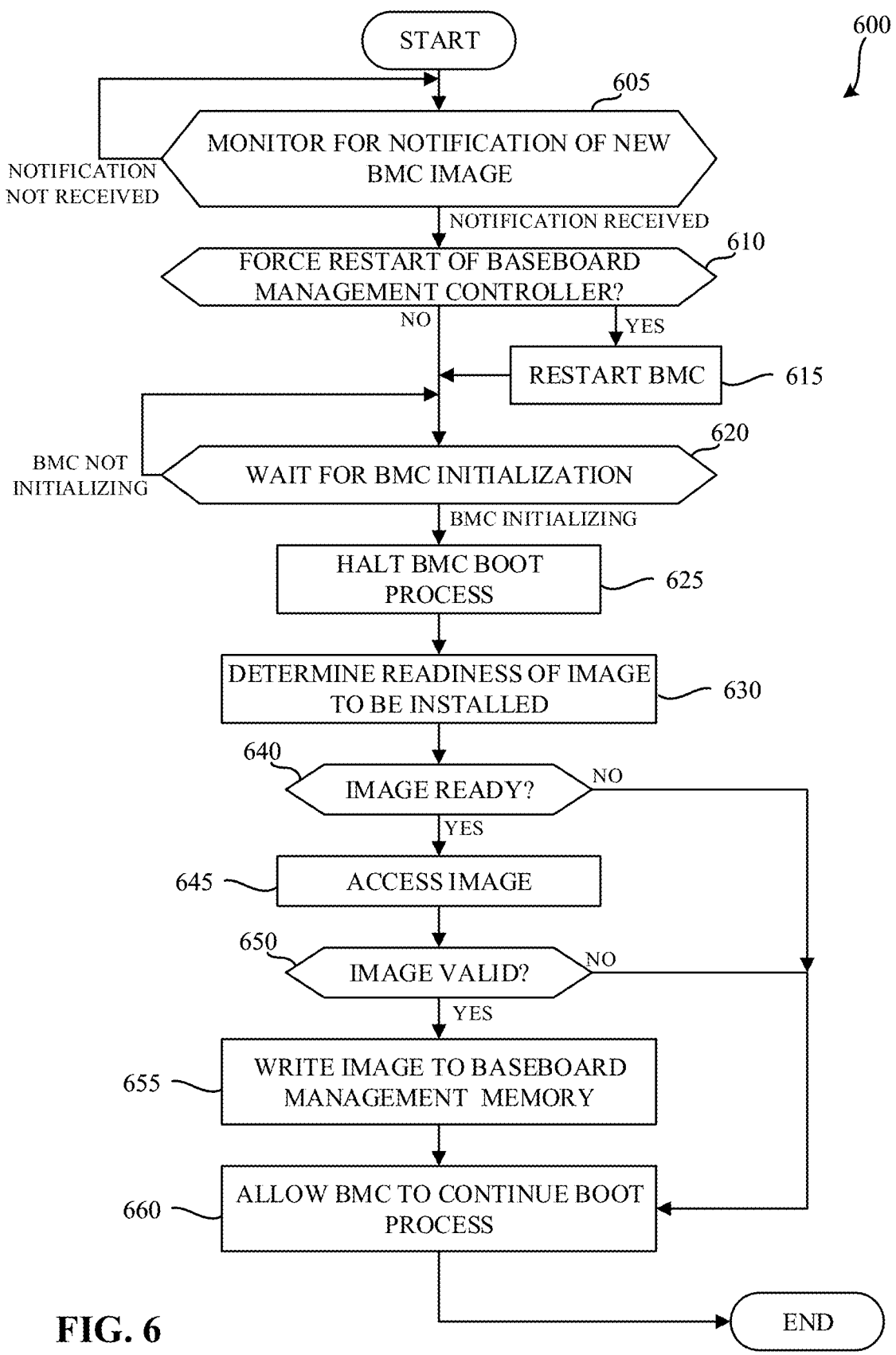
FIG. 6 is a flowchart representative of machine readable instructions which may be executed to implement the example platform firmware resilience controller of FIGS. 1 and/or 2 to update a firmware used by the BMC of FIG. 1.

FIG. 6 is a flowchart representative of machine readable instructions which may be executed to implement the example platform firmware resilience controller 120 of FIGS. 1 and/or 2 to update a firmware used by the BMC 110 of FIG. 1. The example process 600 the illustrated example of FIG. 6 begins when the example host communicator 250 monitors for a notification of a new image to be installed at the BMC 110. (Block 605). The example host communicator 250 continues to wait until a notification is received (e.g., while block 605 does not return a notification).

Upon receipt of a notification, the example BMC interface 210 determines whether the BMC 110 is to be restarted. (Block 610). In examples disclosed herein, updates are applied during the BMC initialization process. Thus, the BMC 110 is either restarted at the request of the platform firmware resilience controller 120, or the platform firmware resilience controller 120 waits for the BMC 110 to be restarted. In some examples, a restart of the BMC may be forced to cause the host initialization process to occur. If the example BMC interface 210 determines that the host restart should be forced (e.g., block 610 returns a result of YES), the example BMC interface 210 initiates a restart of the BMC 110. (Block 615). Alternatively, the example BMC interface 210 may determine that the BMC restart should not be forced, but instead should be allowed to occur at a later time (e.g., in response to an instruction from a user, in response to a regularly scheduled restart, etc.)

The example BMC interface 210 then monitors the BMC 110 to identify when a BMC initialization is occurring. (Block 620). The example BMC interface 210 waits until the BMC initialization is detected before proceeding. Upon detection of the BMC initialization process (e.g., block 620 returning a result of BMC INITIALIZING), the example baseboard management memory interface 220 sets a flag in the baseboard management memory 115 indicating to the BMC 110 that the boot process should be halted. (Block 625). The example firmware memory interface 240 accesses the image to determine the readiness of the image to be installed. (Block 630). As some time may have passed since the BMC updater 130 provided the indication of the image availability (see block 540 of FIG. 5) (e.g., if the restart of the host was not forced), the image might no longer be ready (e.g., may have been overwritten). The image may be considered ready to be installed if the firmware memory interface 240 is able to access the image in the firmware memory 107. The example firmware memory interface 240 determines whether the image is ready. (Block 640). If the image is not ready, the example baseboard management memory interface 220 clears the flag in the memory indicating to the BMC 110 that the boot process may proceed. (Block 660). Alternatively, in some examples, the example firmware memory interface 240 may wait an amount of time and/or re-check to determine whether the image is ready before determining that the image is not ready, thereby allowing the BMC 110 to continue the boot process.

If the image is ready (e.g., block 640 returns a result of YES), the example image validator 230 accesses the image via the example firmware memory interface 240. (Block 645). The example image validator 230 then validates the image. (Block 650). In examples disclosed herein, the validator validates the image by computing a checksum, and comparing the computed checksum against a known value. If the image is not valid (e.g., block 650 returns a result of NO), the example baseboard management memory interface 220 clears the flag in the memory indicating to the BMC 110 that the boot process may proceed. (Block 660). That is, booting is allowed to continue without installation of the image.

If the example image validator 230 determines that the image is valid (e.g., block 650 returns a result of YES), the example baseboard management memory interface 220 writes the validated image to the baseboard management memory 115. (Block 655). In examples disclosed herein, the example baseboard management memory interface 220 writes the image to the appropriate region of the baseboard management memory 115 (e.g., an active region or a recovery region). The example baseboard management memory interface 220 then clears the flag in the baseboard management memory 115 indicating to the BMC 110 that the boot process may proceed. (Block 660). The example process 600 of the illustrated example of FIG. 6 then terminates.

Figure 7:
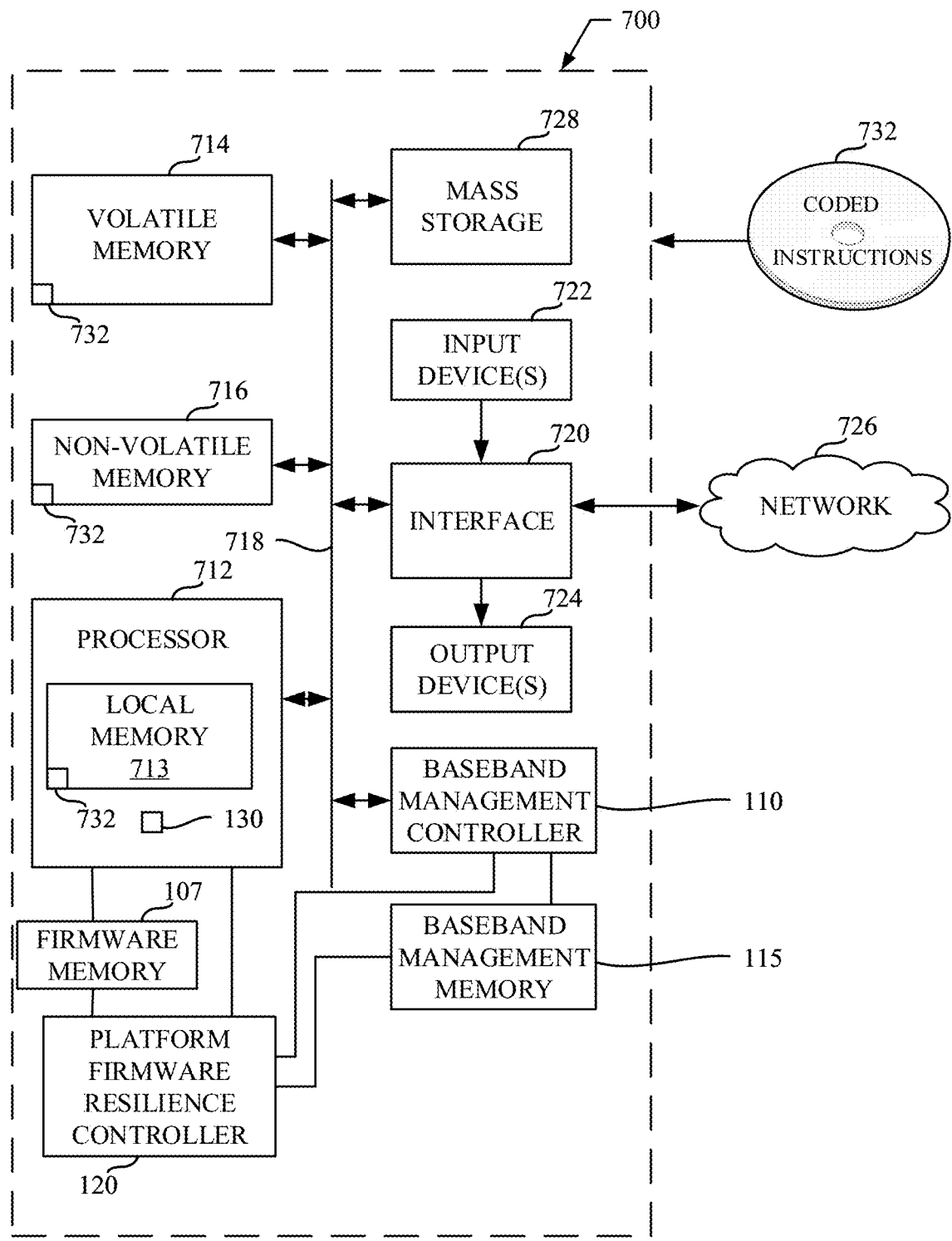
FIG. 7 is a block diagram of an example processing platform structured to execute the instructions of FIGS. 3, 4, 5, and/or 6 to implement the example computer system of FIG. 1.

FIG. 7 is a block diagram of an example processor platform 700 structured to execute the instructions of FIGS. 3, 4, 5, and/or 6 to implement the platform firmware resilience controller 120 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example BMC updater 130. In the illustrated example of FIG. 7, the processor platform 700 includes the example baseboard management controller 110, the example baseboard management memory 115, the example platform firmware resilience controller 120, and the example firmware memory 107. In some examples, the baseboard management memory 115 and/or the example firmware memory 107 may be implemented by the example volatile memory 714, the example non-volatile memory 716, and/or the example mass storage 728.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 3, 4, 5, and/or 6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that enable firmware updates in situations where the existing firmware is not functional. The disclosed methods, apparatus and articles of manufacture improve the efficiency of using a computing device by enabling remote updates to be applied to a processor via a platform firmware resilience controller. Using the platform firmware resilience controller ensure that firmware updates are performed securely, even when the existing firmware used by the processor is not functional. The disclosed methods, apparatus and articles of manufacture are accordingly directed to one or more improvement(s) in the functioning of a computer.

Example 1 includes an apparatus to apply a firmware update to a host processor, the apparatus comprising a baseboard management controller interface to access a notification from a baseboard management controller that a firmware image is available in a baseboard management memory, a host communicator to identify, in response to the notification, an occurrence of a boot process of the host processor, the host communicator to halt the boot process, a baseboard management memory interface to access the firmware image in the baseboard management memory, an image validator to validate the firmware image, and a firmware memory interface to, when the firmware image is valid, write the firmware image to a firmware memory of the host processor, the host communicator to enable the boot process using the firmware image stored in the firmware memory.

Example 2 includes the apparatus of example 1, wherein the baseboard management controller interface communicates with the baseboard management controller using an inter-integrated circuit bus.

Example 3 includes the apparatus of example 1, wherein the baseboard management controller interface, the host communicator, the baseboard management memory interface, the image validator, and the firmware memory interface are implemented as a complex programmable logic device.

Example 4 includes the apparatus of example 1, wherein the host communicator communicates with the host processor using a serial peripheral interface bus.

Example 5 includes the apparatus of example 1, wherein the host communicator is to determine whether to force a restart of the host processor, the restart of the host processor to trigger the boot process.

Example 6 includes the apparatus of example 5, wherein the host communicator is to transmit an instruction to the host processor to cause the host processor to restart.

Example 7 includes at least one non-transitory machine readable medium comprising instructions that when executed, cause a logic device to at least access a notification from a baseboard management controller that a firmware image is available in a baseboard management memory, identify, in response to the notification, an occurrence of a boot process of a host processor, halt the boot process of the host processor, access the firmware image from the baseboard management memory, validate the firmware image, in response to determining that the firmware image is valid, write the firmware image to a firmware memory, and enable the host processor to continue the boot process using the firmware image stored in the firmware memory.

Example 8 includes the at least one non-transitory machine readable medium of example 7, wherein the instructions, when executed, further cause the logic device to determine whether to force a restart of the host processor, the restart of the host processor to trigger the boot process.

Example 9 includes the at least one non-transitory machine readable medium of example 8, wherein the instructions, when executed, further cause the logic device to, in response to determining that the host processor should be restarted, instruct the host processor to restart.

Example 10 includes the at least one non-transitory machine readable medium of example 7, wherein the instructions, when executed, further cause the logic device to determine a readiness of the image to be installed into the firmware memory, wherein the validation of the image is performed in response to the determination that the image is ready to be installed into the firmware memory.

Example 11 includes the at least one non-transitory machine readable medium of example 10, wherein the determining of the readiness of the image to be installed includes determining that the image is complete.

Example 12 includes the at least one non-transitory machine readable medium of example 7, wherein the notification that the firmware image is available is received from the baseboard management controller using an inter-integrated circuit bus.

Example 13 includes a system for applying a firmware image, the system including a baseboard management controller to store a firmware image in a baseboard management memory, the baseboard management controller to notify a platform firmware resilience controller of a presence of the firmware image in the baseboard management memory, a host processor to boot using firmware stored in a firmware memory, and the platform firmware resilience controller including a baseboard management controller interface to access the notification from a baseboard management controller, a host communicator to identify, in response to the notification, an occurrence of a boot process of the host processor, the host communicator to halt the boot process, a baseboard management memory interface to access the firmware image in the baseboard management memory, an image validator to validate the firmware image, and a firmware memory interface to, when the firmware image is valid, write the firmware image to a firmware memory of the host processor, the host communicator to enable the boot process using the firmware image stored in the firmware memory.

Example 14 includes the system of example 13, further including an inter-integrated circuit bus to enable communications between the baseboard management controller interface and the baseboard management controller.

Example 15 includes the system of example 13, wherein the platform firmware resilience controller is implemented as a complex programmable logic device.

Example 16 includes the system of example 13, further including a serial peripheral interface bus to enable communication between the host communicator and the host processor.

Example 17 includes a method of applying a firmware update, the method comprising accessing, at a platform firmware resilience controller, a notification from a baseboard management controller that a firmware image is available in a baseboard management memory, identifying, in response to the notification, an occurrence of a boot process of a host processor, halting the boot process, accessing the firmware image from the baseboard management memory, validating the firmware image, in response to determining that the firmware image is valid, writing the firmware image to a firmware memory, and enabling the host processor to continue the boot process using the firmware image stored in the firmware memory.

Example 18 includes the method of example 17, further including determining whether to force a restart of the host processor, the restart of the host processor to trigger the boot process.

Example 19 includes the method of example 18, further including, in response to determining that the host processor should be restarted, restarting the host processor.

Example 20 includes the method of example 17, further including determining a readiness of the image to be installed into the firmware memory, wherein the validating of the image is performed in response to determining that the image is ready to be installed into the firmware memory.

Example 21 includes the method of example 20, wherein the determining of the readiness of the image to be installed includes determining that the image is complete.

Example 22 includes the method of example 17, wherein the notification that the firmware image is available is received from the baseboard management controller using an inter-integrated circuit bus. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to apply a firmware update to a host processor, the apparatus comprising:
   a baseboard management controller interface to access a notification from a baseboard management controller that a firmware image is available in a baseboard management memory;
   a host communicator to, in response to the notification, force a restart of the host processor, the restart of the host processor to trigger a boot process, the host communicator to halt the boot process;
   a baseboard management memory interface to access the firmware image in the baseboard management memory;
   an image validator to validate the firmware image; and
   a firmware memory interface to, when the firmware image is valid, write the firmware image to a firmware memory of the host processor, the host communicator to enable the boot process using the firmware image stored in the firmware memory.

2. The apparatus of claim 1, wherein the baseboard management controller interface is to communicate with the baseboard management controller using an inter-integrated circuit bus.

3. The apparatus of claim 1, wherein the baseboard management controller interface, the host communicator, the baseboard management memory interface, the image validator, and the firmware memory interface are implemented as a complex programmable logic device.

4. The apparatus of claim 1, wherein the host communicator is to communicate with the host processor using a serial peripheral interface bus.

5. The apparatus of claim 1, wherein the host communicator is to transmit an instruction to the host processor to cause the host processor to restart.

6. The apparatus of claim 1, wherein the validator is to compute a checksum of the firmware image and compare the computed checksum to a stored checksum in order to validate the firmware image.

7. At least one non-transitory machine readable medium comprising instructions that when executed, cause a logic device to at least:
   access a notification from a baseboard management controller that a firmware image is available in a baseboard management memory;
   force a restart of a host processor, the restart of the host processor to trigger a boot process of the host processor;
   identify, in response to the notification, an occurrence of the boot process of the host processor;

halt the boot process of the host processor;
access the firmware image from the baseboard management memory;
validate the firmware image;
in response to determining that the firmware image is valid, write the firmware image to a firmware memory; and
enable the host processor to continue the boot process using the firmware image stored in the firmware memory.

8. The at least one non-transitory machine readable medium of claim 7, wherein the instructions, when executed, further cause the logic device to determine a readiness of the image to be installed into the firmware memory, wherein the validation of the image is performed in response to the determination that the image is ready to be installed into the firmware memory.

9. The at least one non-transitory machine readable medium of claim 7, wherein the notification that the firmware image is available is received from the baseboard management controller using an inter-integrated circuit bus.

10. The at least one non-transitory machine readable medium of claim 8, wherein the determining of the readiness of the image to be installed includes determining that the image is complete.

11. A system for applying a firmware image, the system including:
a baseboard management controller to store a firmware image in a baseboard management memory, the baseboard management controller to notify a platform firmware resilience controller of a presence of the firmware image in the baseboard management memory;
a host processor to boot using firmware stored in a firmware memory; and
the platform firmware resilience controller including:
a baseboard management controller interface to access the notification from a baseboard management controller;
a host communicator to, in response to the notification, force a restart of the host processor, the restart of the host processor to trigger a boot process, the host communicator to halt the boot process;
a baseboard management memory interface to access the firmware image in the baseboard management memory;
an image validator to validate the firmware image; and
a firmware memory interface to, when the firmware image is valid, write the firmware image to a firmware memory of the host processor, the host communicator to enable the boot process using the firmware image stored in the firmware memory.

12. The system of claim 11, further including an inter-integrated circuit bus to enable communications between the baseboard management controller interface and the baseboard management controller.

13. The system of claim 11, wherein the platform firmware resilience controller is implemented as a complex programmable logic device.

14. The system of claim 11, further including a serial peripheral interface bus to enable communication between the host communicator and the host processor.

15. A method of applying a firmware update, the method comprising:
accessing, at a platform firmware resilience controller, a notification from a baseboard management controller that a firmware image is available in a baseboard management memory;
forcing a restart of a host processor, the restart of the host processor to trigger a boot process of the host processor;
identifying, in response to the notification, an occurrence of the boot process of the host processor;
halting the boot process;
accessing the firmware image from the baseboard management memory;
validating the firmware image;
in response to determining that the firmware image is valid, writing the firmware image to a firmware memory; and
enabling the host processor to continue the boot process using the firmware image stored in the firmware memory.

16. The method of claim 15, further including determining a readiness of the image to be installed into the firmware memory, wherein the validating of the image is performed in response to determining that the image is ready to be installed into the firmware memory, and the validating of the image is performed by computing a checksum of the image and comparing the computed checksum to a stored checksum.

17. The method of claim 15, wherein the notification that the firmware image is available is received from the baseboard management controller using an inter-integrated circuit bus.

18. The method of claim 16, wherein the determining of the readiness of the image to be installed includes determining that the image is complete.

* * * * *